United States Patent [19]

Bell et al.

[11] 4,399,176

[45] Aug. 16, 1983

[54] AUTOMOTIVE FLOOR MAT HAVING RIGID RIB

[75] Inventors: Ted A. Bell; Timothy S. Cooksey, both of Coshocton; Daniel F. Lehner, West Lafayette, all of Ohio

[73] Assignee: Pretty Products, Inc., Coshocton, Ohio

[21] Appl. No.: 318,841

[22] Filed: Nov. 6, 1981

Related U.S. Application Data

[63] Continuation-in-part of Ser. No. 135,253, Mar. 31, 1980, abandoned.

[51] Int. Cl.$^3$ .......................... B32B 3/30; B32B 3/02
[52] U.S. Cl. ....................................... 428/85; 296/1 F; 428/122; 428/139; 428/156; 428/167; 428/192; 428/225
[58] Field of Search ............... 428/156, 167, 102, 123, 428/192, 193, 105, 83, 85, 95, 122, 225, 139; 296/1 F; 15/238; 4/581, 661; D12/203

[56] References Cited

U.S. PATENT DOCUMENTS

| | | | |
|---|---|---|---|
| 2,021,522 | 11/1935 | Schacht | 428/167 |
| 2,082,928 | 6/1937 | Wilhelmy | 428/156 |
| 2,810,672 | 10/1957 | Taylor | 428/167 |
| 3,391,959 | 7/1968 | Stata | 296/1 F |
| 3,424,265 | 1/1969 | Stata | 296/1 F |
| 3,450,429 | 6/1969 | Stata | 296/1 F |

FOREIGN PATENT DOCUMENTS 2728180  1/1979  Fed. Rep. of Germany ...... 296/1 F

*Primary Examiner*—Paul J. Thibodeau
*Attorney, Agent, or Firm*—Robert E. Stebens

[57] ABSTRACT

A floor mat for an automotive vehicle is provided having a relatively thin, flexible sheet-form main body and a rigidifying rib structure formed with or secured thereto in fixed relationship. The rigidifying rib structure is fabricated from or formed by elongated elements that are effectively rigid and thereby render the otherwise flexible main body essentially inflexible. The materials selected to form the rib structure preferably have a resilient characteristic, such as spring steel wire rod, to enhance the mat's ability to maintain itself in a desired smooth, flat configuration on a vehicle's floor. The rib structure is of a configuration to rigidify the main body in two generally perpendicular directions to resist displacement in all directions through the essential rigid rib encountering of any obstructions associated with the vehicle floor and the resilient characteristic of the rib accommodating excessive displacing forces and tending to return the main body of the mat to its original configuration. The rib elements may be rod-like elements or flat strips either integrally embedded in or formed with the sheet-form main body or they may be mechanically secured thereto.

50 Claims, 31 Drawing Figures

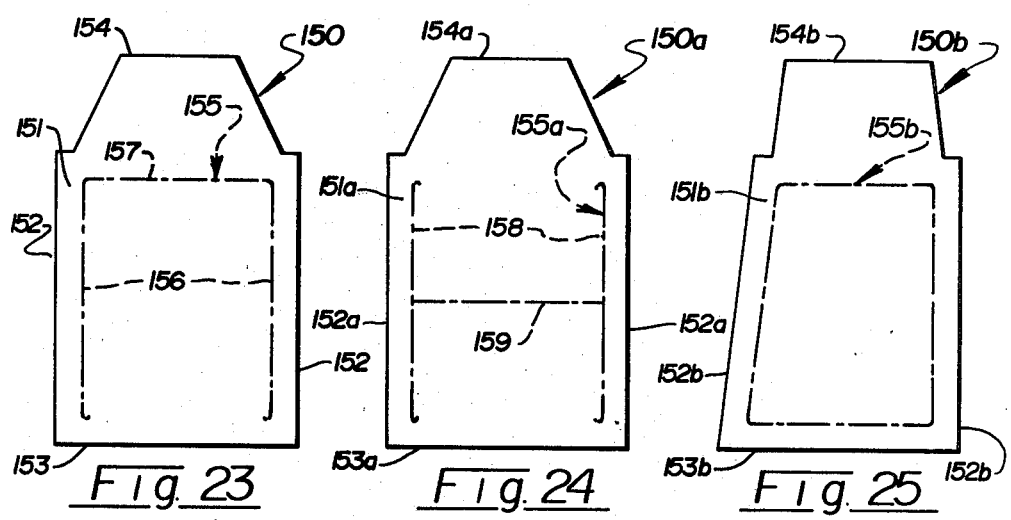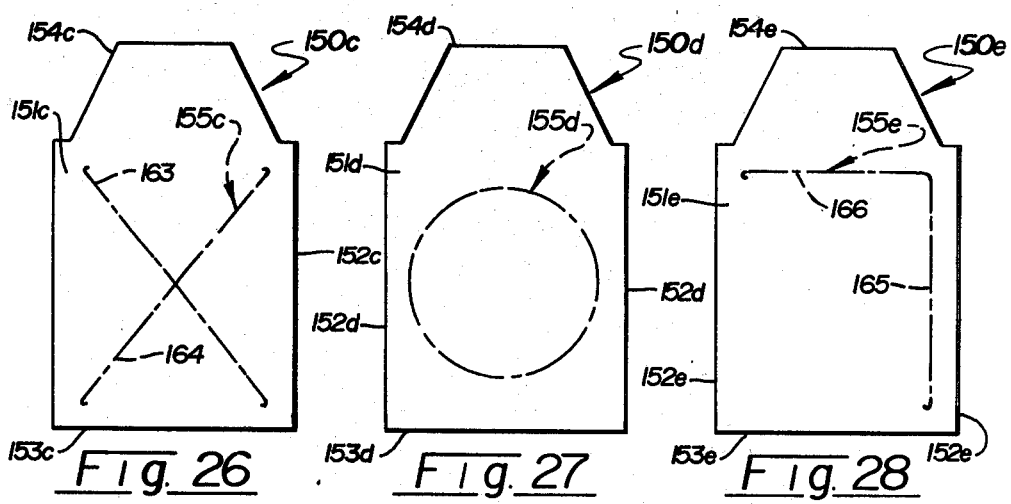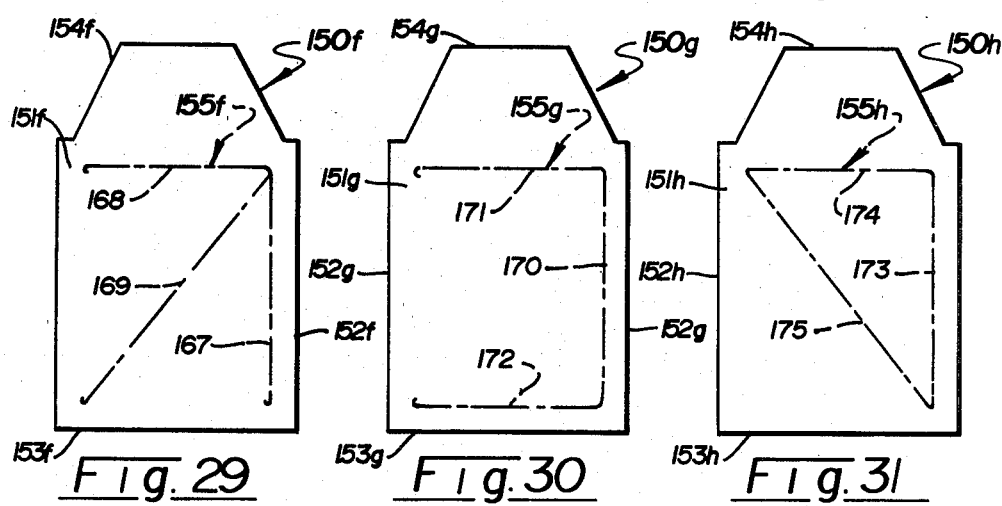

AUTOMOTIVE FLOOR MAT HAVING RIGID RIB

This application is a continuation-in-part of Ser. No. 135,253 filed Mar. 31, 1980 which application is now abandoned.

FIELD OF THE INVENTION

This invention, in general, relates to floor mats designed for use in automotive vehicles. It relates more specifically to a floor mat of this type embodying a construction whereby a thin, flexible sheet-form material such as rubber or vinyl plastic is rendered effectively rigid.

BACKGROUND OF THE INVENTION

Floor mats of many diverse designs have been developed for utilization in automotive vehicles, particularly passenger cars, and are currently extensively utilized for protection of the carpeted floor areas of automotive vehicles and specifically those areas associated with the front seat. These floor mats have been produced in various styles, designs and configurations with major style categories being either a single mat extending across the entire width of the vehicle and termed a full mat or a pair of mats designated as twin mats wherein separate mats are provided at each of the respective sides of the vehicle. The floor mat construction of this invention is specifically directed to the twin style mat, although it does have application to other styles of mat configurations.

A twin style mat for the front seat areas of a passenger car has a basic dimensional configuration such that it is of a length to extend forwardly over at least the lower portion of what is often designated as the fire wall or engine compartment wall which is usually upwardly inclined in a forward direction. Also, these mats are often of a dimensional width such that the opposite longitudinal edge portions at each side of the mat project a sufficient distance laterally to extend up over the central tunnel that exists in many vehicles as well as to project upwardly adjacent the side sill adjacent a door area. Obviously, in the case of vehicles that do not have a central tunnel, the edge portion of the mat disposed adjacent the center area of the vehicle will merely project over the central, substantially flat floor surface. In the case of mats designed for placement in the rear passenger seat area, such mats are of a design configuration that normally does not project forwardly in the manner of the front mats, but they often include longitudinal side portions that do extend over the tunnel or upwardly adjacent the side sill of the vehicle. Depending upon the particular vehicle and relative size of a floor mat selected for that vehicle, it may be that the floor area is sufficiently large that the mat will only occupy a flat surface area.

It is particularly important to design the floor mats so that they will tend to stay in a desired and selected position in the vehicle regardless of whether the floor surface is totally flat or has upwardly projecting surface portions. To achieve that objective, floor mats as heretofore designed have usually incorporated a multiplicity of relatively short, conically-shaped projections, or nibs, that were integrally formed with the mat and projected downwardly from a lower or bottom surface of the mat. Since most mats are of a design construction that embodies molding of the mat from a rubber or plastic composition, it has been relatively easy to form those nibs. The function of these nibs, and these nibs are relatively short and may only be of the order of one-sixteenth inch in length, is to project into the carpet floor covering of the vehicle and thereby form a mechanical interengagement that is intended to retain the floor mat in a selected position. However, the nibs that have heretofore been provided for that purpose have been found to be substantially less effective than desired because of the relatively short length of those nibs. The short length prevents the nibs from penetrating to any significant depth in the carpet and thus the mat must rely primarily on surface friction for the maintenance of the mat in the desired position. It is not feasible to form the nibs of any substantial length for increased penetration and better holding capability since those nibs would then either be relatively thin or relatively thick and most likely not readily penetrate the relatively close fiber pile construction of the conventional carpet surfacing. In fact, long, thin nibs would not only fail to readily penetrate a conventional fiber pile because of greater flexibility, but that flexibility would significantly reduce their effectivity in holding the mat agains laterally directed forces.

As a consequence of the failure of the nibs to effect an adequate mechanical interengagement with the underlying carpet, and the lack of any other significant surface frictional forces, the floor mats heretofore provided have a strong tendency to shift and move laterally over the carpet surfacing in the vehicle. Such lateral shifting movement results from sliding movement of a person's feet when positioned on a mat or the development of laterally directed forces applied to a carpet through a person's feet while entering or exiting the vehicle. This is highly undesirable in that the mat not only loses its neat looking appearance, but additionally, it frequently will shift into a position where it does not protect the floor carpet and, in the case of the driver's station, can easily move into interfering relationship with operating and control components of the vehicle such as the accelerator, light switches, and similar type elements.

The foregoing discussion is directed to floor mats intended for use with vehicles having carpeted floors and it will be readily apparent that mats provided with nibs on their bottom surfaces will not be particularly effective with smooth or hard faced surfaces. While no mat structures or designs are known to exist to improve resistance to lateral displacement over such a floor surface, the problem is not of great significance because there is not the great need to attempt protecting such floor surfaces as in the case of carpeted floors.

SUMMARY OF THE INVENTION

A floor mat as provided in accordance with this invention for utilization in automotive vehicles is constructed to have a degree of rigidity in at least portions of an otherwise flexible sheet and thus tend to retain a planar configuration that will effectively resist sliding movement over non-planar floor surfaces. In general, the embodiments of the invention disclosed herein incorporate a rigid rib, or plurality of rigid ribs, integrally formed in, embedded in securely fixed relationship, or otherwise mechanically secured to a thin, flexible-sheet mat structure. The functional objective of incorporation of the rigid rib is to provide a degree of inflexibility to the floor mat which is otherwise formed as a thin sheet from a flexible material such as rubber or plastic. The configuration of this rigid rib is that, in a preferred design, it will comprise two longitudinally extending elements and two transversely extending elements in a rectangular shape. The longitudinal elements are maintained in a fixed, spaced apart relationship such that they extend in substantially close conformity with the longitudinally extending portions of either the tunnel or the sidewall of the vehicle. As a consequence of the relative inflexibility of the resultant mat structure of this invention, the mat then will tend to not move or shift laterally over the non-planar surfaces of the vehicle's floor. The ribs may be formed from either a metallic wire rod or from a plastic material, or even a hard rubber, having the necessary structural rigidity characteristics to effectively rigidify at least selected portions of the thin sheet of rubber or plastic forming the main body of the mat. While the term "rigid" is used in this specification to describe the rib, "rigid" is not necessarily used in its strict literal sense, but is used to distinguish the substantial flexibility of the main body. In actuality, the ribs will also have a degree of flexibility because of their cross-sectional size and, in fact, it is preferred that the ribs be formed from a material that is resilient or elastic so that they can accommodate forces that would otherwise result in deformation of the rib.

Depending upon the configuration of a specific vehicle for which a particular mat is designed, the rigid rib will have spaced apart, longitudinally extending elements disposed either closely adjacent a peripheral edge of the mat, or spaced a predetermined distance inwardly thereof depending upon the width of the mat and the desirability of having longitudinal marginal edge portions extending a distance upwardly over either the tunnel or the sidewall of the vehicle. The longitudinal rib elements are interconnected by the transverse rib elements which will maintain those longitudinal elements in the desired spaced apart relationship while the floor mat is disposed and supported on the automotive vehicle floor. The longitudinally extending rib elements are of length and are relatively positioned with respect to the floor mat so as to preferably not extend into a forward extending portion of a front mat and thereby interfere with the conforming of such front portion to an upwardly inclined front engine compartment wall. In general, the longitudinal and transverse rib elements are of a size and arrangement or configuration such that they will cover a surface area that is not greater than the smallest planar floor surface of a group of vehicle models and styles so as to minimize the number of different size mats that need to be manufactured.

Specific embodiments of the invention include the integral embedding of a relatively small diameter wire rod in the body of the flexible-sheet floor mat. A rib which is thus embedded in the mass of rubber or plastic material, such as by a molding operation, will be fixed firmly in the surrounding mass of material. In the case of either rubber or plastic composition floor mats, the wire rod can be located centrally between the surfaces of the sheet material, or it may be positioned relatively closer to an upper or lower surface as may be desired. The wire rod is preferably formed from a metal that has a resilient characteristic so that it will return to its original configuration even though it may have been subjected to a bending or distorting force.

Alternatively, the flexible sheet may be formed with a substantially closed recess or channel having cross-sectional shape and a configuration in plan view to conform with and receive a specific shaped rib. The rib may then be separately formed and merely inserted in the channel where it is mechanically retained in securely fixed relationship with insertion being facilitated through the flexibility of the material from which the floor mat body is fabricated.

Also, the rib may be secured to the exterior of the sheet-form main mat body by any of several means or auxiliary devices. For example, a rib may be adhesively secured or otherwise bonded to the surface of the main body. The rib may be of channel form so as to mechanically interlock with a cooperatively configured projection formed with the mat body. Additionally, auxiliary rib retaining elements may be used to secure the rib in fixed relationship with the mat body.

In another embodiment of the invention, the rigid rib design feature can be incorporated with a mat structure that comprises a base sheet formed from rubber or plastic and having central areas provided with woven textile carpet. In usual structures of this type mat design, the base sheet is formed with a recess into which at least a base portion of the carpet is disposed with the carpet conveniently secured therein by a suitable adhesive. An embodiment of the invention, including the rigid rib in such a structure, may have the rib disposed within that recessed area and concurrently secured in position by the adhesive bonding and securing of the carpet section to the base sheet.

A further embodiment of this invention provides a floor mat structure in which the flexible mat is fabricated from a section of woven textile carpeting and having the rigid rib mechanically secured to a lower surface thereof. This securing of the rib can be readily accomplished by direct sewing or stitching with thread or by means of auxiliary rib securing devices.

Configurations of the rigid rib, as previously noted, may be of various dimensional configurations and the particular shape, in plan view, may be other than a closed rectangle. It may be of a U-shape in which the longitudinal legs are interconnected by a cross member portion that is secured at one end of those legs. Also, the longitudinal elements of the rigid rib may be interconnected by a transverse member which is secured thereto and extends between the longitudinal elements at a point intermediate the ends thereof. These configurations are designed to maintain the longitudinal elements thereof in spaced relationship, and thereby form a barrier or obstruction to the lateral displacement of the mat with respect to any upstanding portions of the vehicle floor such as the central tunnel or vehicle side wall or the upwardly inclined engine compartment wall. The rib may be configured as an "X" or an "O" and be capable of performing the rigidifying function. Also, the rib need not be of a rod-like configuration. The rib may be of a relatively flat, rectangular cross-section in the case of being formed from a relatively hard rubber or plastic or it may be formed as a woven wire screen or as a perforated metal strip provided the resiliently rigid characteristics are maintained. The rigid rib in any of these embodiments functions to maintain a substantial portion of the mat as a relatively rigid and inflexible sheet which is particularly effective in preventing the mat from moving or attempting to shift upwardly with respect to such upwardly extending or projecting surfaces of the vehicle floor.

These and other objectives of this invention will be readily apparent from the following detailed description of illustrative embodiments thereof and the accompanying drawings.

DESCRIPTION OF THE DRAWING FIGURES

FIGS. 23-31 are diagrammatic top plan views of nine different floor mats embodying this invention with each having respective rigid ribs of different modified configuration.

DESCRIPTION OF THE ILLUSTRATIVE EMBODIMENTS

Figure 1:
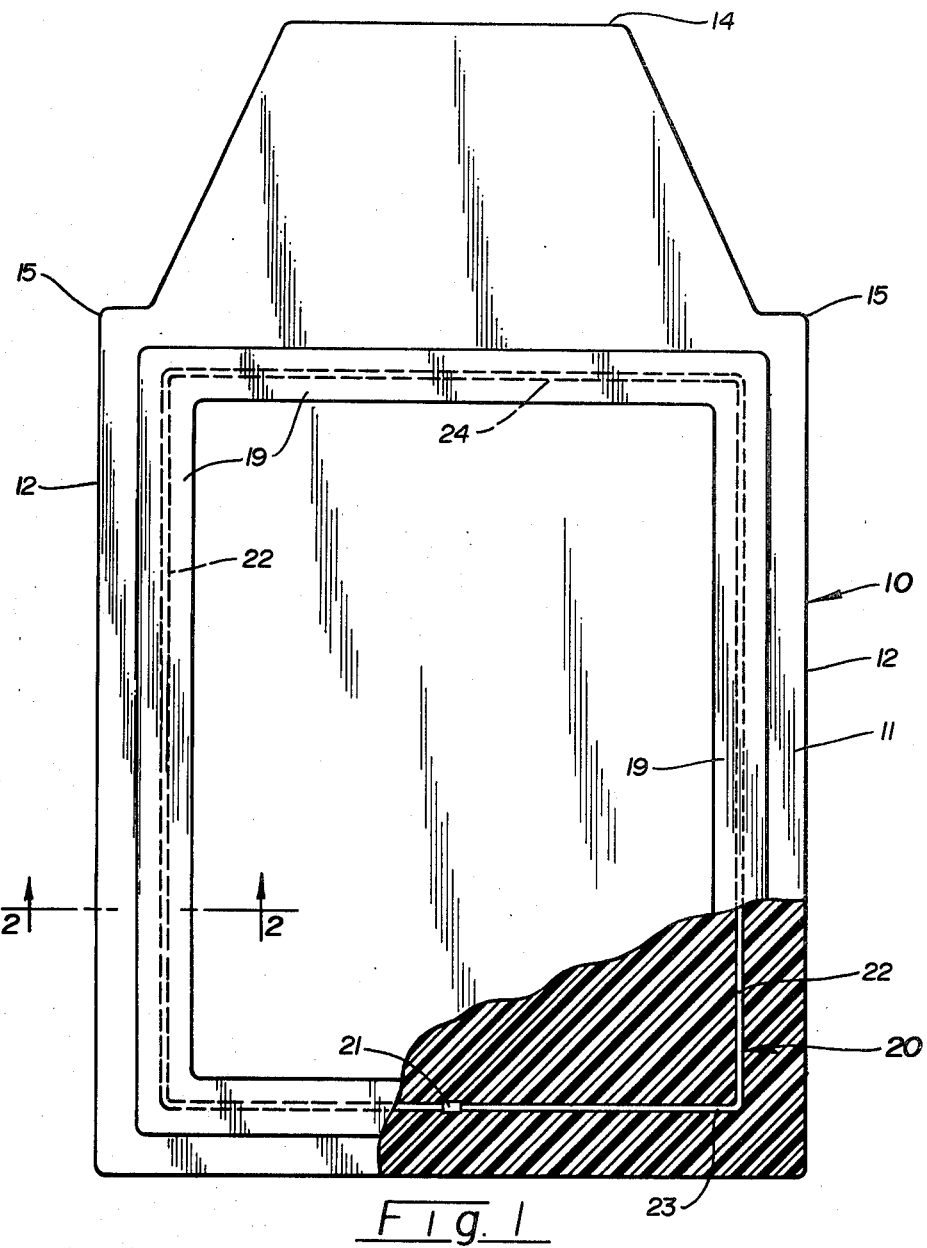
FIG. 1 is a top plan view of an automotive floor mat having a rigid rib and embodying this invention with a corner portion of the body removed for clarity of illustration.
Figure 2:
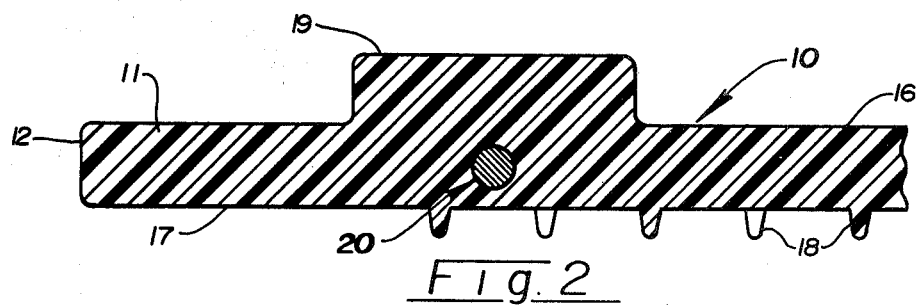
FIG. 2 is a fragmentary vertical sectional view on a substantially enlarged scale taken along line 2—2 of FIG. 1.

Referring specifically to FIGS. 1 and 2, an automotive floor mat is illustrated therein which is shown as comprising a typical configuration for a front mat. This mat is designated generally by the numeral 10 and includes a main body 11 formed from a sheet of flexible material, such as either a rubber or plastic composition. This main body is of a generally rectangularly shaped configuration which, in this illustrative embodiment, has a larger primary portion designed to overlie the flat, horizontal floor area of the vehicle and a relatively smaller portion formed at the front for extending a distance upwardly over the upwardly and forwardly inclined engine compartment wall found in a large number of vehicle body styles. Thus, the illustrative mat configuration is seen to include a peripheral edge having opposed longitudinal side edges 12, a transverse rear edge 13 and a composite front edge 14. This composite front edge 14 defines the front portion of the mat that is intended to overlie the upwardly inclined engine compartment wall and is seen to define an area of trapezoidal configuration. Opposite ends of the composite front edge 14 join with the longitudinal side edges 12 at a point with respect to the overall total length of the mat such that those juncture points 15 may coincide closely with the juncture between the flat, horizontal portion of the vehicle floor and the engine compartment wall.

As previously indicated, the main body 11 of the floor mat is advantageously fabricated from a suitable rubber or plastic composition. Such materials may be readily formed by well-known molding techniques into a relatively thin, flexible sheet having the desired design configuration. Although not shown in this illustrative embodiment, such mats frequently incorporate ornamental design features formed on an upper surface 16 or in an upper surface layer. These mats are of a relatively thin construction with the thickness between the upper surface 16 and a lower surface 17 being of the order of 3/16 or ¼ inch. Also, in a typical mat construction of this type, the main body 11 is advantageously provided with a multiplicity of relatively short, conically-shaped projections or nibs 18 that are formed on the lower surface 17. These nibs 18 are preferably integrally formed with the main body of the mat during the molding process. In this illustrative embodiment, the main body 11 of the mat is formed with a thicker section in certain areas to define an upwardly projecting rib 19 that is formed around the mat body and spaced a distance inwardly from the peripheral edges. This rib 19 is provided primarily for functional reasons as will be further explained, but it may also serve as an ornamental feature.

In accordance with this invention, the mat is provided with a rigid rib 20, or rigidifying rib structure which, in this specific embodiment, is of a closed rectangular configuration and dimensioned similar to the rib 19 as is indicated in broken lines in FIG. 1. The rigid rib 20 is formed from a metallic rod such as a steel wire having a diameter of the order of 1/16 inch and which is substantially less than the thickness of the main body 11. Thus, as can be seen in FIG. 2, the rib may be totally embedded within the main body where it will be firmly fixed in the surrounding mass of rubber or plastic material. This may be accomplished concurrently with the molding operation in forming the main body. The wire rod selected for the rigid rib 20 is thus first formed into the desired configuration and preferably has its opposite ends at their point of juncture 21 rigidly interconnected as by welding so as to achieve greater structural integrity. When thus formed, the rib 20 may then be placed with the rubber or plastic composition materials in the press mold and supported therein in the cavity so as to be properly positioned with respect to the upper and lower surfaces 16 and 17 of a fabricated mat and located in the region of the relatively thick, integrally formed rib 19 of the main body of the mat. In the illustrative embodiment, it is shown that the rib 20 is located relatively closer to the lower surface 17 of the mat. This placement of the rib results in a greater depth of the main body portion of the mat above the rib thereby decreasing the likelihood of the rib being visually observed at the upper surface of the mat.

The rigid rib 20 in the FIG. 1 embodiment of this invention is formed from steel rather than plastic to assure that it will withstand the elevated temperatures encountered during the molding operation for curing of the rubber material. Obviously, if a suitable plastic material were available that could also withstand the rubber curing temperature and maintain its shape and physical properties, such a material could be used in fabrication of the rigid rib. It will also be noted that the term "rigid" is used in identifying the wire rod rib 20, but it will be readily apparent that this rib is of such a small diameter that it is not rigid in the true sense of the word. The wire rod is certainly not so structurally strong that it cannot be bent, but the wire rod is rigid in a comparative sense as to the rubber sheet forming the main body 11 of the mat. The wire rod forming the rib 20 is fabricated from a steel that enables the rib in this cross-sectional size to flex or bend under the forces expected to be applied during use. For example, a person entering or exiting a vehicle will exert a substantial force through pressing one foot against the floor mat and, if applied in the area of the rib, will most likely be sufficient to deform the rib or cause it to flex downwardly because of the yielding characteristic of the underlying carpet. Since it is undesirable that the rib retain a deformed configuration when once flexed, and it is not a practical feasibility to form the wire rod with such a large cross-section as to be inflexible and capable of fully resisting the reasonably expected forces, it is preferred that the rib 20 be fabricated from a steel wire rod having a characteristic resilient property. A spring steel found suitable for the rib 20 is designated as ASTM 228. There are other spring steels commercially available that could also be used and other spring steels may be selected with due consideration to the cross-section of the rod. If a plastic material were found suitable to meet the elevated molding temperature requirement, consideration should also be given to resilient properties of the plastic to assure that a plastic rib would also return to its original configuration.

The particular configuration of the rib 20, as illustrated in FIG. 1, is of a rectangular shape having longitudinal side elements 22 and transversely extending rear and front elements 23, 24. Orientation of the rectangular rigid rib 20 in the illustrative embodiment of FIG. 1 is such that the opposed longitudinal side elements 22 are each disposed a predetermined distance inwardly of the respective longitudinal side edges 12 of the main body 11 with the rear element 23 also disposed a predetermined distance inwardly with respect to the transverse rear edge 13 of the mat. The front element 24 of the rib, however, is positioned so that it does not lie within the front portion of the main body and preferably is disposed a predetermined distance rearwardly with respect to an imaginary line interconnecting the opposed juncture points 15 and which may concide with the juncture of the vehicle's horizontal floor surface and the engine compartment wall. Preferably, the relative location of the longitudinal side elements 22 of the rib are such that, with a main mat body having a width such that longitudinal marginal edge portions would tend to overlie and extend upwardly with respect to either or both the center tunnel or the side wall of the car, these side elements would substantially coincide with the juncture line of the tunnel and side wall, respectively, with respect to the flat, horizontal floor of the vehicle. The result of this construction is that the mat body circumscribed by the rib 20 becomes an effectively rigid sheet.

Functioning of the rigid rib 20 in combination with the main mat body 11 to restrict and essentially prevent lateral displacement of the mat over the surface of the vehicle floor can be readily understood through consideration of the mechanical and geometrical relationships of the mat and the vehicle floor. In a floor mat of the prior construction that merely comprises a sheet-form body formed from a material such as rubber and which does not incorporate a rigid rib 20, the body will be relatively flexible and can readily move so as to travel over and accommodate itself to irregular surface areas such as the juncture between the flat surface portions of the vehicle floor and the upwardly projecting tunnel, side wall or engine compartment wall. This movement will occur as a consequence of a person moving their feet across the floor with a sliding motion or when a person enters or exits the vehicle. When merely sliding a foot across the floor, sufficient frictional forces are developed between a person's shoe and the surface of a rubber or plastic mat to overcome the restraining forces that may be developed by any nibs formed on the bottom surface through their interengagement with an underlying carpet surface. This action will result in a lateral shifting of the mat, a movement which may be in small increments. Movement of a flexible sheet mat of the prior art type not provided with a rigid rib as in accordance with this invention will not be prevented by its encountering upwardly extending surfaces such as the center tunnel, the engine compartment wall or door sill wall. Such flexible sheet mats will merely bend and flex to conform to and follow around any irregular, non-planar surfaces that are encountered.

However, by forming the mat with the rigid rib in accordance with this invention, as is illustrated and described, it will be relatively impossible for the mat to shift laterally over the floor surface because of the side elements 22 and the front element 24 of the rib 20 engaging respective junctures of the vehicle's horizontal floor with the other upwardly extending surface components. For any further lateral shifting of a mat to occur, there must be a sufficient force applied to result in vertical lifting of a substantial potion of the main body portion of the mat. This results from the fact that the transverse elements in the case of transverse shifting, must tend to raise the intermediate section of the mat if a surface such as the center tunnel or the vehicle side wall is encountered. The weight of the mat is such that it will aid in tending to resist such vertical displacement that could be occasioned by laterally directed, shifting forces that are normally expected to be applied through the course of movement of a person's feet over the surface of the mat. This functional characteristic is also applicable to a longitudinal shifting of the mat in a forward direction since the front element 24, in attempting to move upwardly over the inclined surface of the engine compartment wall, will also result in an upward inclination of the longitudinal side elements 22 and in effect, require lifting of a substantial portion of the floor mat. Again, the weight of the floor mat itself will tend to resist such lateral shifting. Furthermore, the lateral shifting is only caused in normal instances, by the sliding of a person's foot over the mat and, since the weight of the person's foot and associated leg are exerting a downward directed force on the mat, this downwardly directed force will be transmitted through the rigid rib element to that element encountering an upwardly extending surface and thereby further increase the resistance of the mat to any lateral shifting.

Also, the resilient characteristic of the rigid rib 20 significantly aids in tending to resist lateral shifting of the mat over upwardly extending surfaces. In a situation where a side or front element 22, 24 of the rigid rib is at a juncture of the vehicle's horizontal floor with an upwardly extending surface, a further force of sufficient magnitude tending to cause sliding or lateral shifting of a mat may cause upward bowing or flexing of the rib element or elements extending in a direction transverse to that juncture thereby tending to reduce the forces on the element, or portion thereof, at the juncture that might otherwise cause that element to be displaced upwardly. Upon subsequent removal of such lateral displacing force, the resilient rib element will return to its original configuration and the mat will again lie flat on the horizontal vehicle floor. In a mat of the prior art construction that is without a rigid rib, such mat would most likely buckle and fold upon application of a force sufficient to cause sliding, thereby not only forming unsightly ridges, but placing the mat in a configuration that will actually enhance its ability to move. Subsequent application of sliding forces will find less resistance and may more readily move the mat so as to cause a fold at another point, an action that results in an incremental lateral shifting of the mat. Thus, the resilient characteristic of the rigid rib in mats embodying this invention represents an improvement over even providing of a rib that is truly rigid and inflexible, although it will be recognized that a completely rigid and inflexible rib is not feasible from a practical standpoint as previously explained.

Figure 3:
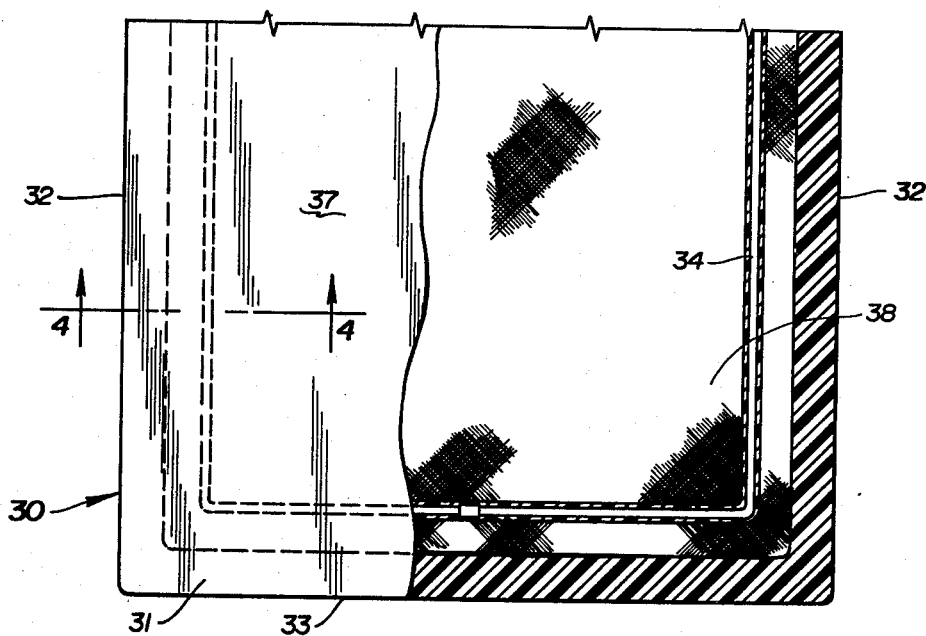
FIG. 3 is a top plan view of a portion of a modified floor mat having a rigid rib and embodying this invention.
Figure 4:
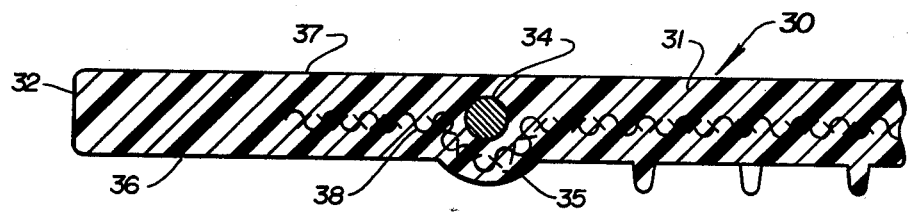
FIG. 4 is a fragmentary vertical sectional view on a substantially enlarged scale taken along line 4—4 of FIG. 3.

A vehicle floor mat 30 of modified construction and embodying this invention is illustrated in FIGS. 3 and 4. This modified floor mat includes a main body 31 formed as a thin sheet from a suitable rubber or plastic material and is thus relatively flexible. This mat may be of a dimension and configuration similar to that previously described with respect to the FIG. 1 embodiment and thus only end portion of this mat is illustrated with the peripheral longitudinal edges 32 and rear transverse edge 33 being indicated. Also included in this floor mat structure is a rigid rib 34 fabricated substantially as previously described with respect to the FIG. 1 embodiment. This rib 34 is thus seen to comprise a rectangular shape and essentially comprising an elongated rod having a generally circular cross-section. The rib is also fabricated from a material such as the identified spring steel to achieve the same objectives previously described. The rigid rib 34 is also designed to be integrally molded into the main body 31 and the main body is thus advantageously provided with a thickened portion forming a small, integrally formed rib 35 projecting downwardly from a lower surface 36 of the main body of the mat. Again, it is preferred that the rigid rib 34 be positioned between the lower surface 36 and an upper surface 37 of the mat body to be more closely adjacent the lower surface and thus the integral rib construction 35 which is aligned with the rigid rib provides the necessary thickness of material to cover the rigid rib. In this embodiment of the invention, additional reinforcing is provided to prevent the rigid rib from tearing through the relatively thin membrane portion of the main body of the mat underlying the rib. This reinforcing is provided by a sheet of woven textile fabric material 38 which is positioned to extend through the main body 31 in substantially coplanar relationship and to extend under the rigid rib 34. During the molding operation, the material forming the main body 31 will thus flow through the woven textile fabric which is of a sufficiently open weave for that purpose and thereby embed that fabric material integrally into the main body structure. The fabric material may comprise a relatively narrow strip that underlies the rigid rib and extends only a short distance to either side thereof or that textile material may be of sufficient size to extend throughout the central portion of the mat body. While the reinforcing has been described as being a woven textile, the reinforcing may comprise strands of steel or metal or even plastic. Regardless of the material selected, the size of strands and the mesh size would be selected to readily permit the rubber or plastic material to flow through and to thereby form a good mechanical bond.

Figure 5:
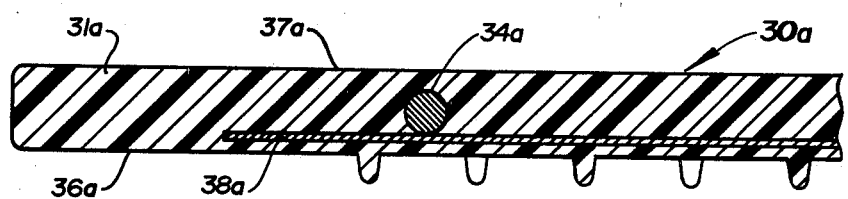
FIG. 5 is a fragmentary vertical sectional view similar to FIG. 4, but showing a modification of the mat structure.

FIG. 5 illustrates a slightly modified form of the mat structure that is illustrated in FIGS. 3 and 4. This further modification eliminates the integrally formed rib 35 and results in the substantially flat sheet without either an upward projecting rib or downwardly projecting rib. Again, the rigid rib 34a is embedded in the main mat body 31a between the lower and upper surfaces 36a,37a and a sheet of woven textile fabric material 38a is also molded into the sheet of material in interposed relationship between the rib 34a and the lower surface 36a. This modified structure would be more appropriate to a mat which is designed to have a relatively greater thickness for a given diameter rigid rib as it is important to have sufficient material forming the main body overlying and underlying the rib to assure that it will not readily tear through the material.

Figure 6:
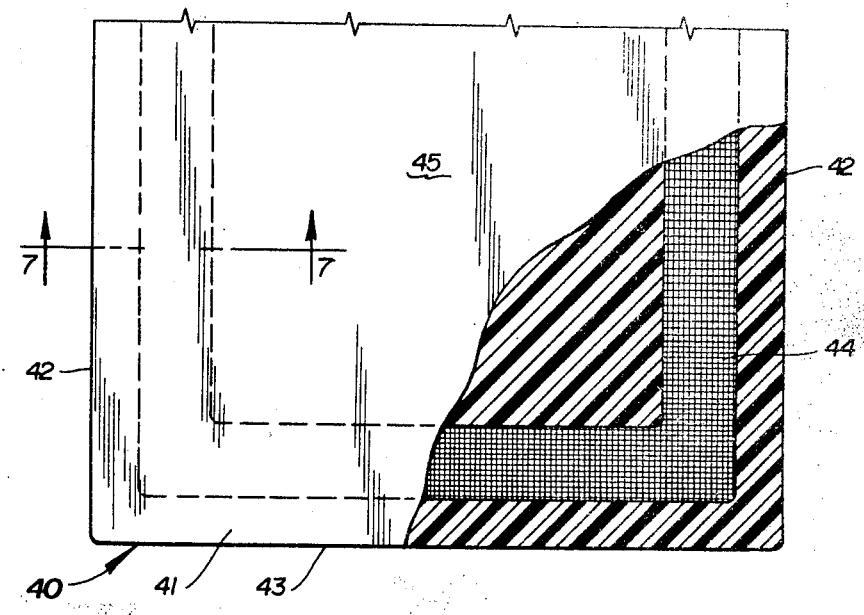
FIG. 6 is a top plan view of a portion of a further modified floor mat having a rigid rib and embodying this invention.
Figure 7:
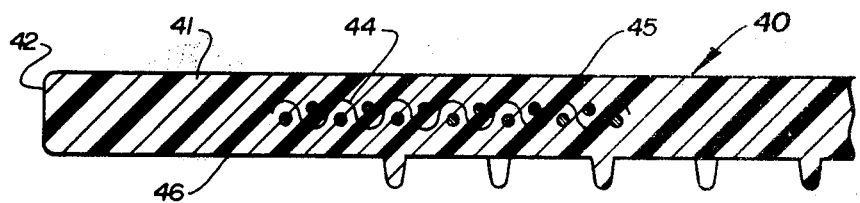
FIG. 7 is a fragmentary vertical sectional view on a substantially enlarged scale taken along line 7—7 of FIG. 6.

A vehicle floor mat 40 of a further modified construction and embodying this invention is illustrated in FIGS. 6 and 7. This modified mat 40 may also be of a rectangular configuration such as that illustrated in FIG. 1 and thus only one end portion of the mat is shown in FIG. 6. This end portion of the mat illustrates the construction which includes a sheet-form main body 41 of relatively thin section and fabricated from a suitable material such as rubber or plastic and thus having relatively flexible. The main body 41 is a flat sheet having longitudinal side edges 42 and a rear transverse edge 33. Also in accordance with this invention, the mat structure includes a rigid rib 44 which is embedded in the main body 41 and positioned between the upper and lower surfaces 45, 46 of the main body. The rigid rib 44 in this embodiment is not fabricated in the form of an elongated rod, but embodies a construction which is functionally equivalent. In this particular embodiment, the rigid rib is formed from a woven wire screen and in plan view is seen to comprise a rectangular shape so as to occupy substantially the same position in the main body of the mat as would a round rod rib such as that which is illustrated in the previously described embodiments. This woven screen material is preferably fabricated from a spring steel and thus will have effectively the same characteristics of the round rod ribs and perform in the same manner in maintaining the mat on the horizontal floor portion of the vehicle. The strands forming the screen would be selected to have an appropriate diameter and woven with a mesh size to permit the rubber or plastic to flow through to embed and mechanically secure the screen. The strip of screening may be cut from a sheet or it may be formed as a strip that is folded as at the corners or short strips may be secured together to form a unitary rib structure.

Figure 8:
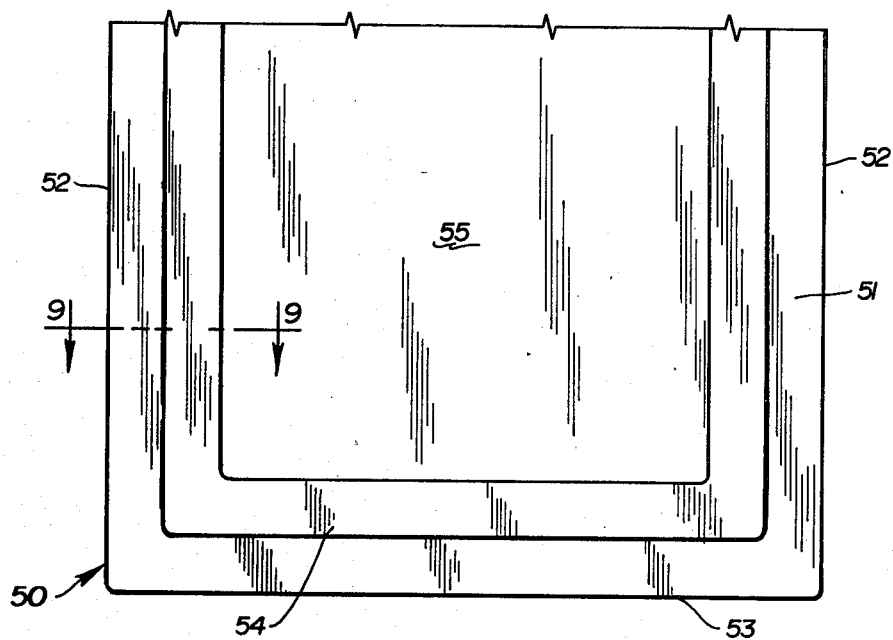
FIG. 8 is a bottom plan view of a portion of another modified floor mat having a rigid rib and embodying this invention.
Figure 9:
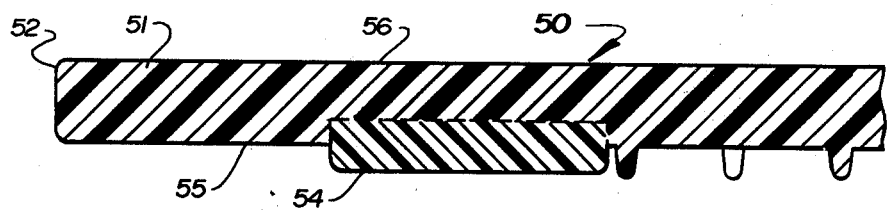
FIG. 9 is a fragmentary vertical sectional view on a substantially enlarged scale taken along line 9—9 of FIG. 8.

A further modified construction for a vehicle floor mat 50 embodying this invention is illustrated in FIGS. 8 and 9. Again, the floor mat 50 may be of a rectangular construction such as that of FIG. 1 and thus only an end portion of the mat is shown. The mat itself comprises a sheet-form main body 51 of relatively thin section and fabricated from a suitable rubber or plastic material and is thus relatively flexible. The main body of the mat 51 includes longitudinal sides edges 52 and a rear transverse edge 53. A rigid rib 54 is also provided in the complete structure of the floor mat, but, in this embodiment, the rigid rib is formed from the same material as the main body, although the particular material forming the rib has different characteristics and physical properties. Thus, for a main body of the mat 51 being formed from a flexible rubber material, the rigid rib 54 would be formed from a different durometer rubber which has a characteristic of being relatively hard and having a substantial degree of structural rigidity along with a resilient characteristic. This rib, as illustrated in the drawings, is formed as a flat strip having a substantial width to thickness ratio and, in plan view, is also formed as a rectangle that is positioned in the main body of the mat substantially as described in the case of the round rod type ribs. Fabrication of a mat embodying the construction of that shown in FIGS. 8 and 9 is accomplished by a single molding operation wherein a preformed strip of the relatively hard rubber material that is to comprise the rigid rib 54 is appropriately positioned in the mold along with the material that is to form the main body of the mat and the two rubber materials are then simultaneously cured under pressure during the molding operation. As a result of this molding operation, the rigid rib will be secured and fixed in relationship to the relatively flexible main body 51 of the mat and this is indicated by the broken line showing the point of demarcation between the two rubber materials. A rigid rib 54 of this construction performs in the same manner to achieve the objectives as previously described with the other configurations and constructions for the vehicle floor mats embodying this invention.

The specific embodiment illustrated in FIGS. 8 and 9 shows the rigid rib 54 being formed with respect to the main body 51 so as to be partially exposed at a lower surface 55 of the main body. It will be apparent that the location of the rigid rib may be otherwise such as for example, locating the rib so to be exposed at the upper surface 56 of the main body 51.

Figure 10:
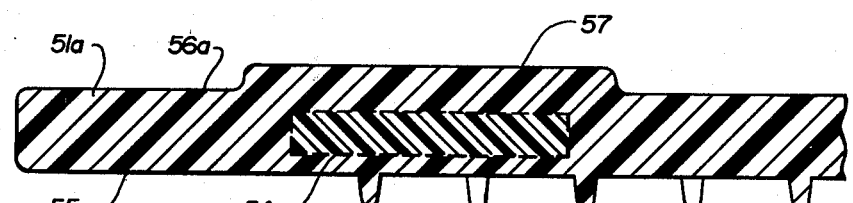
FIG. 10 is a fragmentary vertical sectional view similar to FIG. 9, but showing a modification of the mat structure.

Also, depending upon the relative thickness of the main body forming the mat and that of the rigid rib, it may be possible to completely embed the rib in the main body. Such a modified structure is illustrated in FIG. 10 which comprises a main body 51a of sheet-form fabricated from a rubber material that is relatively flexible and a rigid rib 54a. The rib is positioned intermediate the lower and upper surfaces 55a, 56a and, if necessary, to obtain sufficient strength, the thickness of the main body 51a may be increased at the location of the rigid rib 54a to form either an upwardly projecting integral rib structure 57 as is illustrated or a downwardly projecting rib structure in the manner as described with respect to some of the previously described embodiments of the invention.

Figure 11:
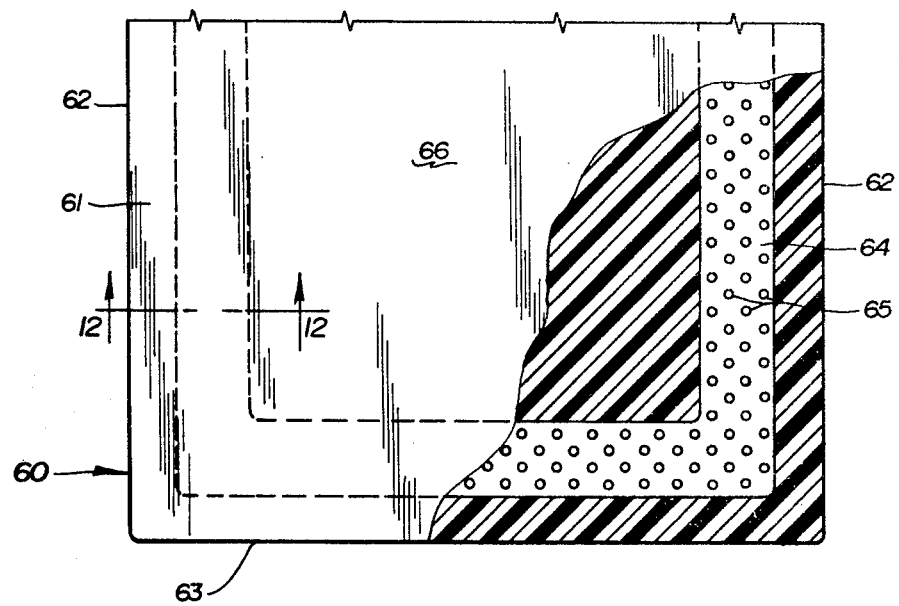
FIG. 11 is a top plan view of a portion of another modified floor mat having a rigid rib and embodying this invention.
Figure 12:
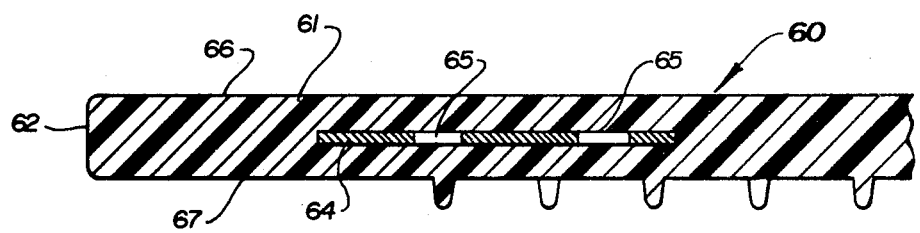
FIG. 12 is a fragmentary vertical sectional view on a substantially enlarged scale taken along line 12—12 of FIG. 11.

Another modified construction for a vehicle floor mat 60 embodying this invention is illustrated in FIGS. 11 and 12. This modified configuration incorporates a construction which is somewhat similar to that illustrated and described with respect to FIGS. 6 and 7. This modified construction includes a sheet-form main body 61 of a desired configuration and illustrated as having longitudinal side edges 62 and a transversely extending rear edge 63. A rigid rib 64 is also incorporated in this structure and in this embodiment, the rib comprises a flat strip of sheet metal formed in a desired configuration which is illustrated as having a thin plate-like form of generally rectangularly shaped configuration. The rib is advantageously formed from a resilient metal having the desired resilient characteristics described in conjunction with the round rod type ribs so as to be capable of providing the necessary rigidity to the composite structure. To reduce the material required in the formation of the sheet metal type rib and also the weight of the total mat, the strip of metal is preferably formed with a plurality of small perforations. These perforations are of a size and shape to readily permit the material forming the main body to readily flow therethrough during the molding operation to enhance the mechanical interlocking of the structure in securing of the rib in rigid relationship to the flexible main body. These perforations are illustrated in FIGS. 11 and 12 as comprising round circles 65. However, it will be apparent that perforations may be of other shapes. The thickness of the rib is at least partially determined by the resilient characteristics of the material from which the rib is formed and its width. It will be noted in FIG. 12 that this rib is essentially positioned at a mid-point between the upper and lower surfaces 66, 67 of the main body of the mat. However, the position may be varied in accordance with specific mat constructions. Also, the rib is illustrated as being formed as a unitary body from a sheet of metal, but it will be understood that the rib may be formed through fabrication processes from an elongated strip through either folding or securing short elements of the strip into the desired configuration.

Figure 13:
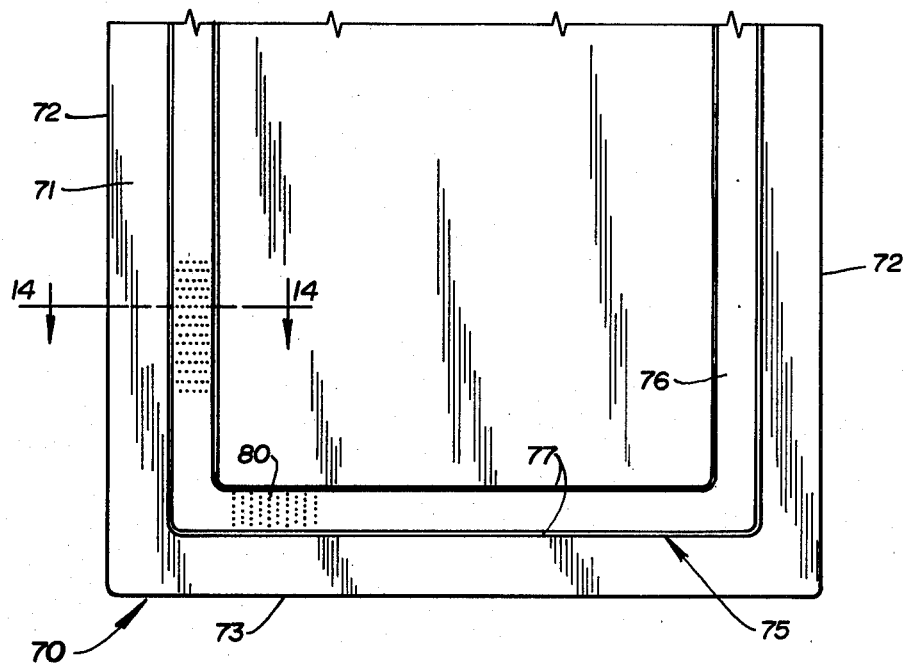
FIG. 13 is a bottom plan view of a portion of another modified floor mat having a rigid rib and embodying this invention.
Figure 14:
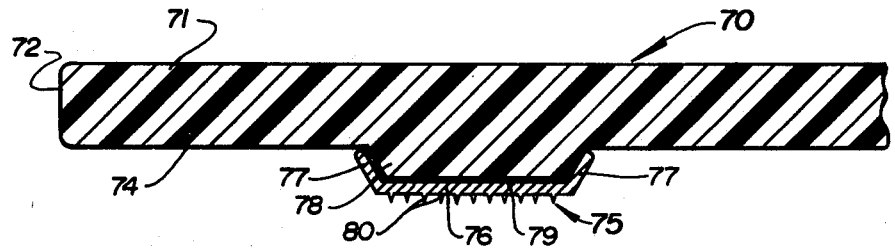
FIG. 14 is a fragmentary vertical sectional view on a substantially enlarged scale taken along line 14—14 of FIG. 13.
Figure 15:
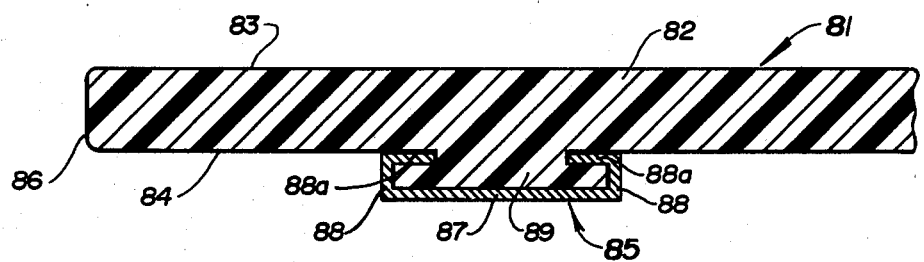
FIG. 15 is a fragmentary vertical sectional view similar to FIG. 14, but showing a modification of the mat structure.

A still further modified construction for a vehicle floor mat 70 embodying this invention is illustrated in FIGS. 13 and 14 with a variation thereof being illustrated in FIG. 15. This mat construction is of a type utilizing an exterior type of rib rather than the generally internal or integrally formed type of rib of the preceding illustrative embodiments. As is shown in FIGS. 13 and 14, this embodiment of the floor mat also includes a sheet-form main body 71 of a desired configuration, but shown as having longitudinal side edges 72 and a transversely extending rear edge 73. The bottom surface 74 of the main body of the mat 71 is shown in FIG. 13 with the rigid rib 75 of this embodiment mounted on that surface in exposed relationship. The rib 75 is of channel form having a base web 76 and upwardly extending flanges 77 which define a shallow channel. The main body 71 is formed with a cooperatively configured downward projection 78 that interfits in the channel of the rib. Securing of the rib to the main body 71 may be effected by adhesive or bonding techniques with a layer of adhesive 79 being illustrated in FIG. 14 as the bonding or securing technique. The rib 75 is formed from a material such as spring steel having the afore-described resilient characteristics and is dimensioned to provide sufficient structural rigidity to maintain the mat in a normally flat planar configuration. If desired, the bottom surface of the rib's base web 76 may be provided with a plurality of downwardly extending nibs 80 adapted to enhance the mechanical retention of the mat with an underlying and supporting carpet. It will be noted that the rib 75 is of a relatively shallow depth as compared to the thickness of the mat's main body 71 and thus does not result in a significant upward displacement of the mat with respect to the supporting carpet.

FIG. 15 illustrates a modification of the exterior rib mat construction specifically shown in FIGS. 13 and 14. In FIG. 15, a floor mat 81 is shown comprising the flexible sheet-form main body 82 having upper and lower surfaces 83 and 84. A rigid rib 85 is provided and is secured to the lower surface of that main body with the rib being shown spaced a distance inwardly from a peripheral edge 86 of the main body. The rib 85 comprises an elongated, strip-form structure which has a desired configuration in plan form such as rectangular similar to that illustrated in FIG. 13 with the rib defining a channel structure. The rib 85 thus includes a base flange 87 and a pair of side flanges 88 that extend along each side of the base flange. These side flanges 88 are L-shaped having one leg thereof 88a directed inwardly to cooperatively define an open slot and they are shown as disposed in substantially parallel relationship to the base flange 87. The main body 82 is formed with a downward projection 89 having a generally T-shaped configuration designed to cooperatively interfit in the channel of the rib 85. This construction enables the rib to be formed separately and then mechanically secured to the main body of the mat by snapping the rib over the T-shaped projection 89 or otherwise forcing that projection into the channel. The cooperative configuration results in a secure mechanical interconnection of the rib with the main body 82 of the mat. Again, the rib is formed from a suitable material having the desired and necessary resilient characteristics to provide adequate structural strength and rigidity to the composite mat structure. While FIG. 15 only illustrates the mechanical interengagement of the rib and the main body, it will be understood that if desired, bonding or adhesive techniques may also be utilized to further enhance the interconnection.

Figure 16:
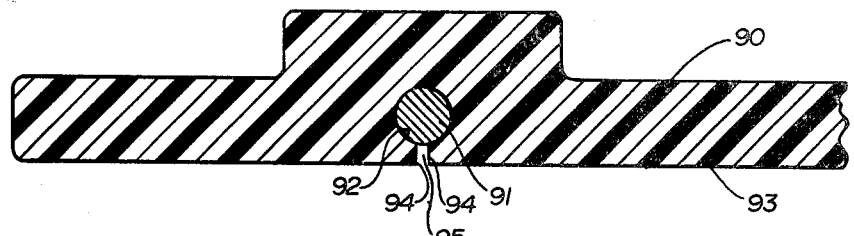
FIG. 16 is a fragmentary vertical sectional view similar to FIG. 2, but showing a modified mat structure embodying this invention.

A rigid rib may be incorporated or associated with a thin, sheet-form main mat body that is relatively flexible otherwise than as herein previously described and illustrated. Such further modified constructions are shown in FIGS. 16–22 wherein a rigid rib is incorporated internally in a mat body or is externally secured therewith by various techniques or methods. The structure of FIG. 16 is substantially similar to that of FIGS. 1 and 2 except that the main mat body 90 and rigid rib 91 are separately formed and then assembled. The mat body 90 is formed by suitable molding techniques from selected rubber or plastic compositions and the rigid rib 91 is formed from a spring steel or resilient plastic. In this embodiment, the main mat body 90 is formed with a channel or recess 92 having the same configuration in plan view and cross-section as that of the rib 91. The channel 92 is formed in the main mat body in closely disposed relationship to a lower surface 93 thereof. Portions of the channel wall in cooperation with the mat body at the surface 93 define a pair of retaining lips 94 that project a distance inwardly across the channel and toward each other to form a relatively narrow opening 95 to the channel. This opening 95 is substantially less in transverse dimension than the diameter of the rigid rib 91. Subsequent to forming of the main mat body 90 with such a channel, the rigid rib 91 may then be pushed into the channel since the mat is formed from a material having adequate elasticity and resilience such that the opening 95 may be sufficiently enlarged to permit passage of the rib therethrough into the channel. When thus assembled, the retaining lips 94 return to their original configuration as molded to cooperatively interengage with the rigid rib 91 to secure the rib in the recess in retained relationship. An advantage of this construction is that the rib is not subjected to the elevated rubber or plastic molding temperatures, thereby affording a wider selection of suitable rib materials.

Figure 17:
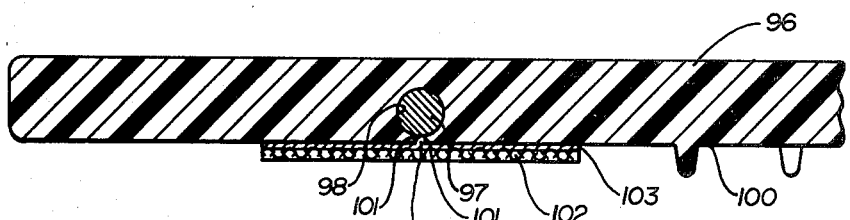
FIG. 17 is a fragmentary vertical sectional view of a modified mat structure similar to that shown in FIG. 16, but showing a further modification thereof.

FIG. 17 illustrates a variation of the modification shown and described with respect to FIG. 16. As in the case with FIG. 16 modification, this diagram illustrates a mat having a channel formed therein to receive a rigid rib, but the structure includes additional means for enhancing the mechanical integrity of the composite structure. Having reference to FIG. 17, a portion of a sheet-form mat body 96 which is of a flexible construction is provided with a rigid rib 97. The mat body 96 is formed with a channel or recess 98 having a cross-sectional configuration to cooperatively receive the rigid rib in fixed, retained relationship. Accordingly, as in the case of the FIG. 16 embodiment, the mat body 96 is provided with a slot form opening 99 providing access to the channel at a lower surface 100 of the mat body. The channel 98 is formed more closely adjacent the lower surface 100 of the mat body, but the mat body at this surface also defines a pair of retaining lips 101 that project inwardly across the channel toward each other to assist in retaining the rib 97 in that channel.

In the embodiment illustrated in FIG. 17, the mat body 96 is of a relatively thin construction without an enlarged integral rib structure as in the case of the FIG. 16 embodiment and thus additional means is preferably provided to assist in maintaining the rib in the recess or channel. This additional means comprises a strip of fabric 102 which is secured to the lower surface 100 of the mat body. This strip of fabric 102, in the illustrative form, comprises a woven textile material which is of a width substantially greater than the lateral dimensions of the rib and its associated recess to thus extend a distance at either side of the opening 99 and projects laterally outward with respect to the rib. The strip of fabric 102 may be readily secured to the mat body by a suitable adhesive disposed in a layer 103 between the adjacent surfaces of the fabric strip 102 and the lower surface 100 of the mat body. This strip of fabric 102 thus functions to provide mechanical strengthening of the mat body in the region of the retaining lips 101 to better secure the rigid rib in fixed relationship with the mat body. While a woven textile fabric is illustrated in the FIG. 17 embodiment, it will be understood that other materials suitable for this purpose such as woven wire screen or a relatively thin strip of rubber or plastic may also be advantageously used. Bonding or securing of the particular strip of material would be in accordance with the materials used in forming the mat body and this reinforcing strip so as to obtain a good mechanical bond.

Figure 18:
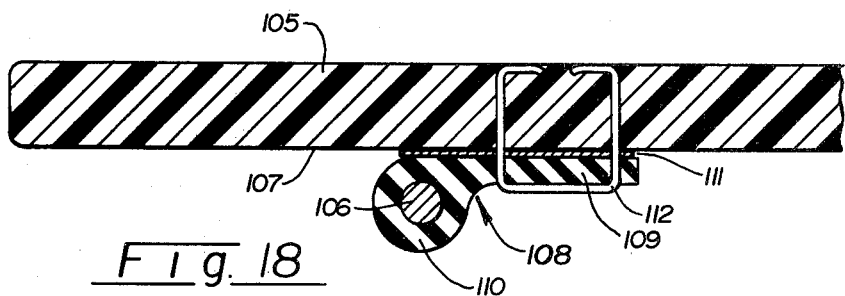
FIG. 18 is a fragmentary vertical sectional view similar to FIG. 2, but showing another modified mat structure embodying this invention wherein the rigid rib is secured to the main mat body at an exterior surface thereof.

A further example of an external type mounting and securing of a rigid rib with a flexible sheet-form mat body is shown in FIG. 18. This modified structure includes a flexible sheet-form mat body 105 and a rigid rib 106 securely fixed to a lower surface 107 of the mat body. The rib 106, which is illustrated as comprising an elongated rod of circular cross-section, is secured to the mat body by a retaining assembly 108. This retaining assembly comprises an elongated extrusion having a flat, relatively thin strip form mounting or securing plate 109 and a rib securing section 110. This extrusion may be formed from a suitable plastic or rubber material having the rigid rib 106 integrally embedded therein during the fabrication process. The material forming the extrusion need not possess the resilient characteristics of the rigid rib as its primary function is to provide an improved mechanical securing of the rib to the flexible mat body. This securing of the retaining assembly 108 may be by adhesive techniques such as utilizing a suitable adhesive disposed in a layer 111 between the adjacent surfaces of the extrusion's securing plate 109 and the lower surface 107 of the mat body. Additional mechanical interconnection can be obtained by the use of mechanical attachment elements such as the illustrated staples 112 or by sewing or stitching with a thread-like filament. In the case of the staples 112 as illustrated, these staples would be disposed at spaced intervals longitudinally of the retaining assembly's extrusion and project through the securing plate 109. The staples 112 have been indicated as being an addition to an adhesive type securing technique, but the staples, as can be readily understood, could be alternative rather than additional. Also, while an adhesive bonding is described, the bonding, depending upon the materials utilized in the retaining assembly extrusion and the mat body, may be of a type other than strictly adhesive.

Figure 19:
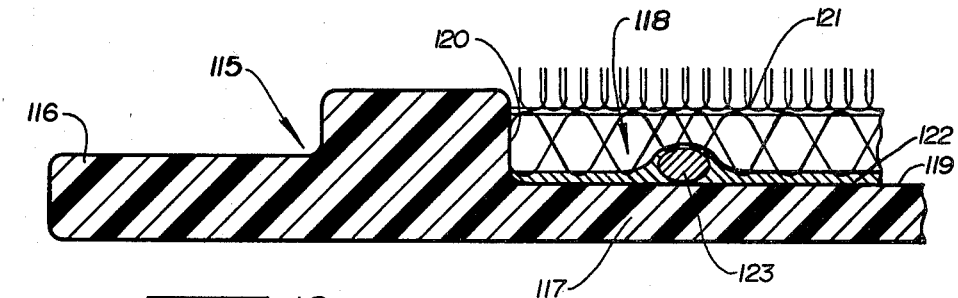
FIG. 19 is a fragmentary vertical sectional view similar to FIG. 2 of another modified floor mat structure embodying this invention wherein the mat includes a textile carpet insert.

With respect to FIG. 19, a floor mat 115 embodying this invention is shown as comprising a main mat body 116 having a base component 117 and is formed from a suitable rubber or plastic composition material. This base component 117 has a configuration such that it defines a recessed, rectangularly shaped area 118 in the upper surface region defined by a bottom surface 119 and inner, vertical wall surfaces 120 with that area adapted to receive a sheet of textile carpet material 121. This sheet of carpet material 121 is secured in the recessed area 118 by a layer of adhesive 122 and thus results in a composite mat construction. In accordance with this embodiment of the invention, such a structure is advantageously provided with a rigid rib 123 which is of a configuration in plan view to extend around the interior of the recessed area with the various elements thereof disposed in inwardly spaced relationship to respective vertical wall surfaces 120 of the recessed area 118. In the illustrative embodiment of FIG. 19, the rib 123 is shown as being of an oval cross-section to reduce vertical height and is positioned on the bottom surface 119 of the recessed area. The adhesive layer 122 is flowed over the rib to secure the carpet 121 in the region of the rib.

Figure 20:
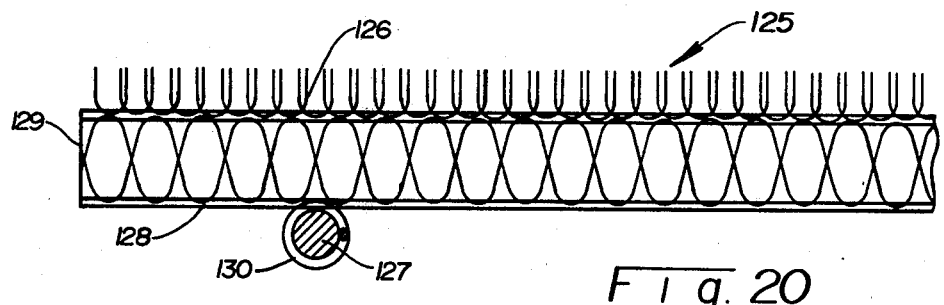
FIG. 20 is a fragmentary vertical sectional view similar to FIG. 2, but showing a modified mat structure wherein the main mat body is a sheet of textile carpeting.
Figure 21:
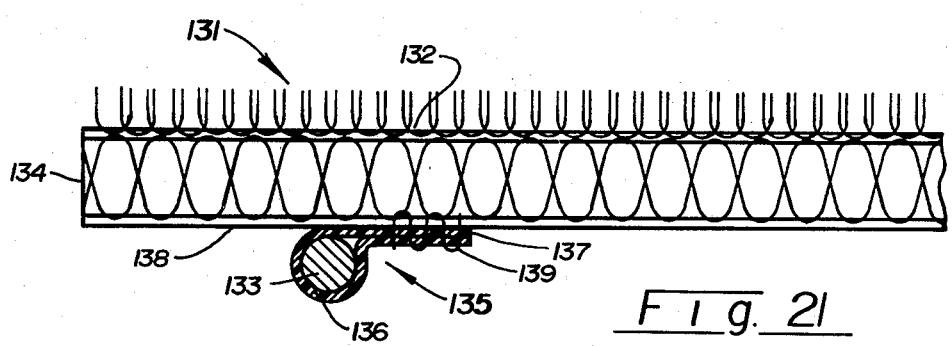
FIG. 21 is a fragmentary vertical sectional view of a modified mat structure similar to that shown in FIG. 20, but showing a further modification thereof.
Figure 22:
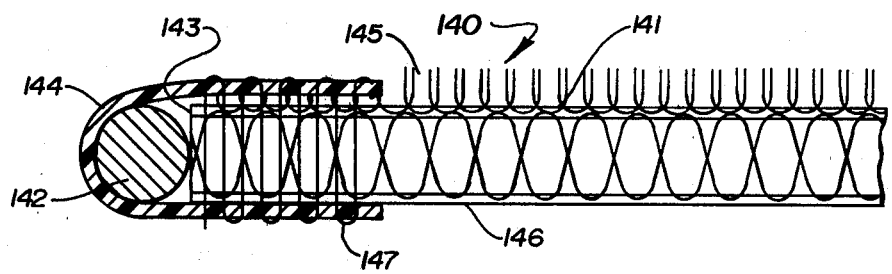
FIG. 22 is a fragmentary vertical sectional view of a modified mat structure similar to that shown in FIG. 20, but showing another modification thereof.

Still further modified mat constructions embodying this invention are illustrated in FIGS. 20–22. These further modified floor mat structures are of a common construction wherein the flexible sheet-form main mat body is formed from a textile material such as floor carpet. The floor carpet, as such, is functionally equivalent to the sheet-form mat structures hereinbefore illustrated and described and fabricated from a suitable rubber or plastic composition. A carpet is also flexible and is subject to the same undesirable lateral displacement over an underlying supporting carpet surface. Car mats embodying a sheet of carpeting are utilized for the same purpose as the rubber or plastic composition mats, namely protection of the original floor carpeting provided in the vehicle.

Referring to FIG. 20, a basic form of a carpet-type mat structure 125 is seen to comprise a sheet-form carpet fabricated from textile materials and which forms the main mat body. The mat body will be of a configuration suitable for a particular style car in the same manner as the design of a rubber composition mat such as that shown in FIG. 1. Also, in accordance with this invention, the floor mat is provided with a rigid rib 127 which is secured to the lower surface 128 of the main mat body and may be disposed a distance inwardly of a peripheral edge 129 thereof. As in the case of the previously described mat structures, the rigid rib 127 is secured to the main body in fixed relationship and this may be readily accomplished by stitching or sewing with a thread-like filament 130. This filament extends around the rib and extends into the textile fibers of the main mat body to obtain a secure mechanical interconnection of the rib with the mat body. The filament 130 may be formed in stitches spaced longitudinally along the rib in a manner adequate to obtain the necessary structural integrity of the composite mat structure.

FIG. 21 illustrates another embodiment of a textile carpet-type floor mat 131 having a main mat body 132 formed from a textile floor carpet material. A rigid rib 133 is also provided in this composite mat structure with that rib being mechanically secured to the main body at a distance inwardly of a peripheral edge 134. A retaining assembly 135 is provided for securing the rib to the main body in much the same manner as the structure illustrated in the FIG. 18 embodiment. This retaining assembly 135 may be fabricated from a fabric such as a woven textile or wire or may be formed from a thin vinyl plastic material in the form of an elongated strip that is wrapped around the rigid rib. In the illustrated configuration of FIG. 21, this retaining assembly has the material formed as a loop 136 extending around the rib 133 with longitudinally extending, marginal edge portions disposed in overlapped relationship to each other and forming a securing strip 137. This securing strip 137 may then be mechanically secured to the bottom or lower surface 138 of the main body 132 by appropriate means or devices. This mechanical attachment may be advantageously affected by sewing or stitching with a thread-like filament 39 which extends through the securing strip 137 and the adjacent portions of the textile carpet material forming the main mat body. Additionally or alternatively, a layer of adhesive may be interposed between the securing strip 137 and the main mat body as well as between the superposed portions of a material forming the securing strip.

In the third illustrative example of a textile type floor mat 140 embodying this invention and illustrated in FIG. 2, a main mat body 141 formed from a sheet of textile carpet material is provided with a rigid rib 142 disposed at a peripheral edge 143 of the main body. Mechanical attachment of the rib is obtained by a binding 144 fabricated from a thin sheet of flexible material that encircles the rib and having opposite longitudinal marginal edge portions thereof disposed in overlying relationship to the respective upper and lower surfaces 145 and 146 of the main mat body. The binding 144 may be fabricated from a sheet of woven textile material or from a thin sheet of vinyl plastic and is conveniently secured to the textile carpet forming the main mat body by sewing or stitching with a thread-like filament. While the binding 144 would advantageously extend around the entire periphery of the main body 141, the rigid rib 142 need not do so as will be indicated in a subsequent description of modifications of rib configurations.

Although several embodiments of the vehicle floor mat heretofore described and illustrated show the rigid rib in a rod form as having a circular or oval cross-section, it will be understood that the rib may be otherwise formed. It may be possible and feasible, in certain instances, to configure the rib with many diverse cross-sections so as to decrease its vertical dimension and to better accommodate to relatively thinner main mat bodies, but retaining sufficient cross-sectional area to attain the necessary structural rigidity. Many geometrical crosssectional shapes and composite shapes such as for example, rectangle, channel, L-shape or T-shape, can be utilized as is determined appropriate for a pariticular mat body or may be dictated by its thickness and cross-sectional configuration or other characteristics.

It will also be understood that the rigid rib incorporated in any of the various mat configurations may be otherwise configured in plan view than as a closed rectangle as is illustrated in the FIG. 1 embodiment. Various other configurations of a rib are diagrammatically illustrated in FIGS. 23-31. Each of these figures only diagrammatically indicates a vehicle floor mat having a configuration somewhat of the nature of that described with respect to the FIG. 1 embodiment. In describing each of these mats and their respective rib configurations, like components and elements will be designated by the same numeral as used with FIG. 23, but distinguished by the respective subscript letters a-h for FIGS. 24-31. Referring to FIG. 23, a floor mat embodying this invention is indicated generally by the numeral 150 and a sheet-form main body 151 is provided that is fabricated from a material such as rubber, plastic, textile or other suitable flexible sheet-form material. The main body 151 includes longitudinal side edges 152 and a transverse rear edge 153. These diagrammatically illustrated mats are also seen to include a front portion 154 which may be adapted to overlie the upwardly and forwardly extending engine compartment wall.

These mats as illustrated in FIGS. 23-31 are also provided with a rigid rib generally identified in FIG. 23 by the numeral 155 and by the same number with the respective subscript letters a-h. In the case of the FIG. 23 embodiment, the rigid rib 155 is formed in plan view in a U-shaped configuration. As such, the rib includes respective longitudinally extending elements 156 that are interconnected at their forward ends by a transverse element 157. The terminal ends of the longitudinal elements 156 at the open end of the U are preferably disposed a distance inwardly from the transverse edge 153 of the mat body and may be turned inwardly upon themselves to minimize the likelihood of a sharp wire end puncturing the mat body.

In the FIG. 24 embodiment, the rigid rib 155a is formed in an H-shaped configuration in plan view. In that configuration, the rib again includes two longitudinally extending elements 158 and those elements are interconnected by a transverse element 159 disposed substantially at the midpoint thereof.

The FIG. 25 embodiment is a mat having a non-rectangular shape, although similar, and is generally designated as a trapezoidal shape. To maintain the rigid rib in a uniform spaced relationship to the peripheral edges of the mat, the rigid rib 155b is thus also formed with a trapezoidal configuration in plan view. Also, as in the case of the FIG. 1 embodiment, the rigid rib 155b of FIG. 25 is formed as a closed loop and includes the spaced apart longitudinal elements 160 that are interconnected at their opposite ends by respective transverse elements 161 and 162.

FIG. 26 illustrates a mat having the rigid rib 155c formed in an X-shaped configuration. As such, the rigid rib includes two elongated elements 163 and 164 which are of a length and orientation such that the respective ends thereof define the four corners of a rectangle. This rib structure also preferably has the two elements rigidly interconnected at their midpoint. Also, each of the ends of those elongated elements preferably has a marginal end portion formed in a loop to avoid having a sharp end of a wire rod which could more readily puncture the relatively soft rubber or plastic material.

In the fifth modified mat configuration of FIG. 27, the rigid rib 155d is formed from an elongated rod formed into a circle with the ends thereof being rigidly interconnected. This rib is of a diameter and is positioned substantially centrally in the main body 151 of the mat such as between the longitudinal side edges 152d and between the transverse rear edge 153d and the front portion 154d.

In FIG. 28 the mat is shown provided with a rigid rib 155e having an L-shaped configuration. With such a configuration, the rib includes a longitudinally extending side element 165 and a transversely extending front element 166. These two elements are rigidly interconnected and are positioned to be cooperatively effective as against a center tunnel juncture with the floor of the vehicle and the upwardly inclined engine compartment wall. For the opposite side of the vehicle, the L-shaped rib 155e would be reversed as to its position in the mat with the longitudinal side element 165 being disposed at the opposite side edge so as to again cooperate with the center tunnel of the vehicle.

A further modification of the L-shaped type rigid rib configuration is shown in FIG. 29. The rigid rib 155f illustrated therein includes the L-shaped portion having a longitudinal side element 167 and a transversely extending front element 168. Additionally, this rib structure includes a diagonally disposed element 169 which is interconnected at the juncture of the longitudinal and front elements with the free ends of each of the three elements and their common juncture defining a rectangle.

Another U-shaped rib 155g is illustrated in FIG. 30. This rib includes a single longitudinally extending side element 170 and the two transversely extending front and rear elements 171 and 172. In this embodiment, the side element 170 is disposed adjacent that side of the mat to be effective as between the tunnel and floor juncture of the vehicle. Where a mat of this type and rib configuration is to be utilized on the opposite side of the vehicle, the rib would be reversed as to its position in the mat to have the side element disposed adjacent the opposite longitudinal side of the mat. FIG. 31 illustrates a triangularly shaped rigid rib 155h having a longitudinal side element 173 and a front transverse element 174 joined to form an L-shaped component. Interconnecting the ends of the two elements forming the L is a diagonally disposed element 175 which is secured to the respective ends of those elements. Again, this rib is oriented in the mat body to have the longitudinal side element 173 disposed at that side which is positioned adjacent to the center tunnel of the vehicle. For a mat positioned at the opposite side, the rib would be reversed as to its orientation to place that side element adjacent the opposite side of the mat.

The several examples of rigid rib configurations that may be formed and utilized in fabrication of a mat embodying this invention are illustrated to provide suggestions as to further modifications that may be useful in adapting the mat to a particular vehicle configuration. The illustrated rib configurations of FIGS. 23-31 as well as the rib structures illustrated in the preceding figures of the drawings are not deemed limitative or exhaustive of the structures and configurations that may be devised and which will also function in the desired manner to enable the mat to better resist lateral sliding forces and prevent displacement of the mat across the vehicle floor. In these rigid rib structures, it will be noted that those having free end elements preferably have those terminal end portions formed in loops to avoid having a sharp end could possibly puncture the relatively thin main body of the mat. Alternatively, devices to enlarge these ends for the same objective could be employed rather than forming loops in the rib itself.

Similarly, it will be understood that the several illustrative embodiments of the rigid rib structures as well as the main mat bodies are not limitative on the specific structures that may be devised. The relatively flexible sheet-form main bodies of the mat may be fabricated in various thicknesses and fabricated from various types of materials. Rubber and plastic compositions are commonly utilized in the fabrication of automotive vehicle floor mats and these materials may be utilized equally well in the fabrication of mats embodying this invention. However, carpet materials in the form of sheets of woven textile carpeting may also be utilized in the fabrication of mats embodying this invention and provided with the rigid rib structure. Various types of materials may also be utilized in the formation of the rigid ribs. The physical criteria of the rib for functioning in the floor mats of this invention is primarily a resiliently rigid element that is capable of providing structural rigidity to the composite structure while permitting a certain degree of flexing to accommodate forces that may be applied as a consequence of persons placing their feet on the floor mat and exerting downward forces as well as laterally directed forces. As was explained in substantial detail, the rigid rib is not rigid in an exact sense, but is rigid as compared to the relatively flexible, thin sheet forming the mat body. An objective of this particular arrangement of components is to enable the mat body to be formed from a relatively thin sheet thereby saving on materials and resulting in economy of manufacture. It will be apparent that the mat body may be fabricated with a substantially thicker cross-section than is illustrated and contemplated in this invention without departing from the spirit of the invention. Also, as was illustrated, it is possible to form enlarged or relatively thicker section portions of the mat body in association with the providing of the rigid rib to also enhance the functioning of the rib in making the total structure more rigid and better able to withstand the effect of laterally displacing forces.

It will be readily apparent from the foregoing detailed description of the several illustrative embodiments of this invention that a particularly novel and advantageous automotive floor mat construction is disclosed. The construction of the floor mat, having a flexible sheet main body portion with a rigid rib incorporated therein, results in a structure that is uniquely capable of resisting lateral displacing forces and thus effectively maintain the mat in a desired fixed position on the automotive vehicle floor.

Having thus described this invention, what is claimed is:

1. A floor mat for an automotive vehicle comprising a flexible, sheet-form main body adapted to be positioned in supported relationship on a vehicle floor and being of an area dimension to cover at least a specified portion thereof, and
a rigidifying rib structure including an elongated, substantially rigid, rib-forming element secured in fixedly assembled association with said main body to effect structural rigidification thereof, said rigidifying rib structure being formed of a material which is different from the material of said main body and being configured to define a plane that is disposed in substantially parallel relationship to said main body and of an area that is coextensive with at least a selected area portion of said main body to provide structural rigidity in substantially mutually perpendicular directions with respect to said main body whereby at least the selected area portion of said main body is effectively rendered substantially inflexible.

2. A floor mat according to claim 1 wherein said rib-forming element is formed from an elongated, rod-like bar.

3. A floor mat according to claim 1 wherein said rib-forming element is formed from a thin, elongated flat strip.

4. A floor mat according to claim 1 wherein said rigidifying rib structure is bonded to said main body.

5. A floor mat according to claim 1 wherein said rigidifying rib structure is adhesively bonded to said main body.

6. A floor mat according to claim 1 wherein said rigidifying rib structure is mechanically secured in fixed association with said main body.

7. A floor mat according to claim 1 wherein said rigidifying rib structure is mechanically secured by auxiliary means in fixed association with said main body.

8. A floor mat according to claim 1 wherein said rigidifying rib structure is formed from at least two elongated rib-forming elements disposed in angularly oriented relationship to each other, said elements being rigidly interconnected to form a unitary structure.

9. A floor mat according to claim 8 wherein the first of said elements is disposed in substantially longitudinally extending relationship with respect to said main body and the second of said elements is disposed in substantially transversely oriented relationship to the first element.

10. A floor mat according to claim 9 wherein said first element is disposed in closely adjacent relationship to a longitudinally extending peripheral edge of said main body.

11. A floor mat according to claim 10 wherein said second element is disposed in closely adjacent relationship to a forward marginal edge portion of said main body.

12. A floor mat according to claim 8 wherein said rigidifying rib structure includes at least three elongated rib-forming elements with all of said elements being rigidly interconnected to form a unitary structure and any two of said elements disposed in angularly oriented relationship to each other.

13. A floor mat according to claim 12 wherein said rib-forming elements are formed into a closed loop.

14. A floor mat according to claim 1 wherein said rib structure is formed from an elongated rib-forming element formed into a closed loop.

15. A floor mat for an automotive vehicle comprising a flexible, sheet-form main body adapted to be positioned in supported relationship on a vehicle floor and of an area dimension to cover at least a specified portion thereof, and a rigidifying rib structure formed from an elongated rib-forming element of thin sheet-form fabricated from a multiplicity of filamentary strands having some of said multiplicity of strands disposed in angularly oriented relationship to others of said strands and secured in fixed association with said main body, said rigidifying rib structure being configured to provide rigidity in both longitudinal and transverse directions with respect to said main body and to thereby effectively render at least a selected area portion of said main body substantially inflexible.

16. A floor mat according to claim 15 wherein said filamentary strands are interwoven into a sheet.

17. A floor mat for an automotive vehicle comprising a flexible, sheet-form main body having opposed surfaces formed from a moldable material and adapted to be positioned in supported relationship on a vehicle floor and of an area dimension to cover at least a specified portion thereof, a rigidifying rib structure embedded in firmly fixed relationship in said main body and disposed in spaced relationship to at least one surface of said main body, said rigidifying rib structure being configured to provide rigidity in both longitudinal and transverse directions with respect to said main body and to thereby effectively render at least a selected area portion of said main body substantially inflexible, and a reinforcing sheet interposed between said rib structure and said one surface of said main body.

18. A floor mat according to claim 17 wherein said rigidifying rib structure is formed from an elongated rib-forming element and said reinforcing sheet is of elongated strip form and of a width to project a distance transversely to said rib-forming element at either side thereof.

19. A floor mat according to claim 17 wherein said reinforcing sheet is formed of interwoven filamentary strands.

20. A floor mat for an automotive vehicle comprising a flexible, sheet-form main body having opposed surfaces and adapted to be positioned in supported relationship on a vehicle floor and of an area dimension to cover at least a specified portion thereof, said main body having formed therein a channel of predetermined configuration and opening at one surface of said main body, and a rigidifying rib structure of cooperative configuration to interfit in said channel in fixed, mechanically retained association with said main body, said rigidifying rib structure being configured to provide rigidity in both longitudinal and transverse directions with respect to said main body and to thereby effectively render at least a selected area portion of said main body substantially inflexible.

21. A floor mat according to claim 20 wherein said rigidifying rib structure is formed from an elongated rib-forming element of predetermined cross-sectional configuration and said channel is formed with a substantially same cross-sectional configuration.

22. A floor mat according to claim 20 wherein said channel and main body cooperatively define a retaining lip projecting in overlying relationship to said channel with said lip adapted to cooperatively interengage with said rib structure.

23. A floor mat according to claim 20 wherein said channel and main body cooperatively define retaining lips projecting mutually inward in overlying relationship to said channel to cooperatively interengage with said rib structure.

24. A floor mat according to claim 20 wherein said main body includes closing means extending across said channel opening.

25. A floor mat according to claim 24 wherein said closing means is an elongated thin sheet secured to the surface of said main body at which said channel opens and is of a width to project a distance transversely at each side of said channel opening.

26. A floor mat according to claim 25 wherein said sheet is bonded to said main body.

27. A floor mat according to claim 25 wherein said sheet is adhesively bonded to said main body.

28. A floor mat according to claim 25 wherein said sheet is formed from interwoven filamentary strands.

29. A floor mat for an automotive vehicle comprising a flexible sheet-form main body adapted to be positioned in supported relationship on a vehicle floor and of an area dimension to cover at least a specified portion thereof, said main body being formed with an elongated projection which extends along a surface thereof in substantially parallel relationship thereto and projects a distance outwardly from said surface, and a rigidifying rib structure including an elongated rib-forming element having a channel-shaped cross section configured to cooperatively receive said projection in interfitting relationship and mechanically secured in fixed association with said main body through said projection, said rigidifying rib structure being configured to provide rigidity in both longitudinal and transverse directions with respect to said main body and to thereby effectively render at least a selected area portion of said main body substantially inflexible.

30. A floor mat according to claim 29 wherein said rib-forming element is formed with an open channel cross-section having a central web portion provided at each longitudinally extending side thereof with a flange.

31. A floor mat according to claim 30 wherein said rib-forming element is bonded to said projection.

32. A floor mat according to claim 29 wherein said rib-forming element is formed with a partially closed channel cross-section, said projection formed on said main body being of a T-shaped cross-section and configured to cooperatively interfit in said channel in mechanically interlocked relationship.

33. A floor mat for an automotive vehicle comprising
a flexible, sheet-form main body adapted to be positioned in supported relationship on a vehicle floor and of an area dimension to cover at least a specified portion thereof, and
a rigidifying rib structure including an elongated rib-forming element mechanically secured in fixed association with said main body by auxiliary means including an elongated thin sheet extending around said rib-forming element in encircling relationship with marginal longitudinal edge portions thereof disposed in superposed relationship to each other and to said main body with said edge portions being secured to said main body, said rigidifying rib structure being configured to provide rigidity in both longitudinal and transverse directions with respect to said main body and to thereby effectively render at least a selected area portion of said main body substantially inflexible.

34. A floor mat according to claim 33 wherein said sheet is secured to a surface of said main body.

35. A floor mat according to claim 33 wherein said sheet is stitched to said main body by stitching means stitched through the superposed marginal edge portions and into said main body.

36. A floor mat according to claim 35 wherein said stitching means is a filamentary strand sewn through said main body and the marginal edge portions of said sheet.

37. A floor mat according to claim 33 wherein said longitudinal marginal edge portions of the sheet receive a marginal edge portion of said main body therebetween, said sheet being secured to said main body by stitching means stitched through the superposed marginal edge portions.

38. A floor mat according to claim 37 wherein a filamentary strand is sewn through the overlapped marginal edge portion.

39. A floor mat for an automotive vehicle comprising
a flexible, sheet-form main body adapted to be positioned in supported relationship on a vehicle floor and of an area dimension to cover at least a specified portion thereof, and
a rigidifying rib structure including an elongated rib-forming element mechanically secured in fixed association with said main body by auxiliary means which includes an elongated strip having said rib-forming element embedded therein and formed with an attaching surface portion adapted to be disposed in overlying relationship to a surface of said main body and to thereby effectively render at least a selected area portion of said main body substantially inflexible.

40. A floor mat according to claim 39 wherein said elongated strip is bonded to said main body.

41. A floor mat according to claim 40 wherein said elongated strip is bonded by an adhesive.

42. A floor mat according to claim 39 or 40 wherein said strip is stitched to said main body.

43. A floor mat according to claim 39 or 40 wherein said strip is secured to said main body by staples extending through superposed portions in longitudinally spaced relationship.

44. A floor mat for an automotive vehicle comprising
a flexible, sheet-form main body adapted to be positioned in supported relationship on a vehicle floor and of an area dimension to cover at least a specified portion thereof, said main body including first and second sheets disposed in superposed relationship and fixedly secured together to form a unitary sheet-form structure, and
a rigidifying rib structure formed from elongated, substantially rigid elements interposed between the first and second sheets of said main body and mechanically secured therewith in fixed association, said rigidifying rib structure being configured to provide rigidity in both longitudinal and transverse directions with respect to said main body and to thereby effectively render at least a selected area portion of said main body substantially inflexible.

45. A floor mat according to claim 44 wherein said sheets are secured together by an adhesive thereby fixing said rib structure therewith.

46. A floor mat according to claim 44 wherein said first sheet is formed from a moldable material and said second sheet is formed from a textile carpeting.

47. A floor mat for an automotive vehicle comprising
a flexible sheet-form main body adapted to be positioned is supported relationship on a vehicle floor and of an area dimension to cover at least a specified portion thereof, and
a rigidifying rib structure formed from an elongated, substantially rigid rib-forming strip of thin plate-like form provided with a multiplicity of apertures, said strip being disposed within and secured in fixed association with said main body, said rigidifying rib structure being configured to provide rigidity in both longitudinal and transverse directions with respect to said main body and to thereby effectively render at least a selected area portion of said main body substantially inflexible.

48. A floor mat for an automotive vehicle comprising
a flexible sheet-form main body formed from a moldable material and adapted to be positioned in supported relationship on a vehicle floor and of an area dimension to cover at least a specified portion thereof, and
a rigidifying rib structure formed from an elongated, substantially rigid, rod-shaped, rib-forming element embedded within and in fixedly secured relationship in said main body, said rigidifying rib structure being formed from a material different from the material used to form said main body and having a structural rigidity substantially greater than that of said main body and being configured to provide rigidity in both longitudinal and transverse directions with respect to said main body and to thereby effectively render at least a selected area portion of said main body substantially inflexible.

49. A floor mat for an automotive vehicle comprising
a flexible sheet-form main body formed from a moldable material and adapted to be positioned in supported relationship on a vehicle floor and of an area dimension to cover at least a specified portion thereof, and a rigidifying rib structure formed from an elongated rib-forming element fabricated from a moldable material of the same type as said main body, but of a substantially greater durometer as to be resiliently rigid and relatively inflexible, said rib structure integrally molded with said main body thereby forming a unitary structure with said rib-forming element configured to provide rigidity in both longitudinal and transverse directions with respect to said main body and to thereby effectively render at least a selected area portion of said main body substantially inflexible.

50. A floor mat for an automotive vehicle comprising a flexible, sheet-form main body adapted to be positioned in supported relationship on a vehicle floor and of an area dimension to cover at least a specified portion thereof, and a rigidifying rib structure including an elongated rib-forming element mechanically secured in fixed association with said main body by auxiliary means which includes a filamentary strand encircling said rib-forming element and which is stitched into said main body, said rigidifying rib structure being configured to provide rigidity in both longitudinal and transverse directions with respect to said main body and to thereby effectively render at least a selected area portion of said main body substantially inflexible.

* * * * *